US010628166B2

(12) United States Patent
Lloyd et al.

(10) Patent No.: US 10,628,166 B2
(45) Date of Patent: Apr. 21, 2020

(54) ALLOCATING AND DEALLOCATING REORDER QUEUE ENTRIES FOR AN OUT-OF-ORDER PROCESSOR (71) Applicant: International Business Machines Corporation, Armonk, NY (US)

(72) Inventors: Bryan Lloyd, Austin, TX (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/709,776

(22) Filed: Sep. 20, 2017

(65) Prior Publication Data
US 2019/0087195 A1 Mar. 21, 2019

(51) Int. Cl.
G06F 9/38 (2018.01)
G06F 9/30 (2018.01)

(52) U.S. Cl.
CPC ........ G06F 9/3855 (2013.01); G06F 9/30196 (2013.01)

(58) Field of Classification Search
None
See application file for complete search history.

(56) References Cited

U.S. PATENT DOCUMENTS

| 5,465,336 | A | * | 11/1995 | Imai | G06F 9/3834 711/167 |
| 6,192,465 | B1 | * | 2/2001 | Roberts | G06F 9/30152 712/212 |
| 6,336,183 | B1 | * | 1/2002 | Le | G06F 9/3834 712/208 |
| 6,725,358 | B1 | | 4/2004 | Moore | |
| 6,988,186 | B2 | | 1/2006 | Eickemeyer et al. | |

(Continued)

OTHER PUBLICATIONS

Jose F. Martinez, et al.,"Cherry: Checkpointed Early Resource Recycling in Out of Order Microprocessors", Procedings of the 35th Annual International Symposium on Microarchitecture (Micro-35), Nov. 2002, p. 1-12.

(Continued)

Primary Examiner — Eric Coleman
(74) Attorney, Agent, or Firm — Cantor Colburn LLP; Jason Sosa (57) ABSTRACT Embodiments of the present invention include methods, systems, and computer program products for allocating and deallocating reorder queue entries for an out-of-order (OoO) processor. An example method includes dividing the reorder queue into a plurality of regions to store reorder queue entries; allocating a plurality of reorder queue entries into an instruction tag array for tracking the reorder queue entries based at least in part on an associated instruction tag; loading instruction tags into each region of the plurality of regions beginning with a first region of the plurality of regions, wherein a first plurality of instruction tags is loaded into the first region; deallocating all of the first plurality of instruction tags of the first region; and subsequent to all of the instruction tags of the first region being deallocated, loading a second plurality of instruction tags to the first region of the plurality of regions.

18 Claims, 5 Drawing Sheets (56) References Cited

U.S. PATENT DOCUMENTS

| | | | |
|---|---|---|---|
| 7,209,482 B1* | 4/2007 | Rahim | H04L 47/10 |
| | | | 370/230 |
| 8,006,075 B2 | 8/2011 | Luttrell | |
| 8,166,214 B2 | 4/2012 | Hamilton | |
| 9,164,772 B2 | 10/2015 | Dockser et al. | |
| 2003/0182540 A1* | 9/2003 | Burky | G06F 9/3824 |
| | | | 712/225 |
| 2010/0064107 A1* | 3/2010 | Eddy | G06F 12/0811 |
| | | | 711/146 |
| 2010/0228912 A1* | 9/2010 | Huang | G06F 12/0893 |
| | | | 711/108 |
| 2010/0333098 A1* | 12/2010 | Jordan | G06F 9/384 |
| | | | 718/103 |

OTHER PUBLICATIONS

Wei-Wu Hu, et al.,"Implementing a 1GHz Four-Issue Out-Of Order Execution Michroprocessor in a Standard Cell Asic Methology" Computer Science & Technology, vol. 22, No. 1, Jan. 2007, p. 1-14.

\* cited by examiner

Divide The Reorder Queue Into A Plurality Of Regions To Store Reorder Queue Entries, Wherein Each Region Of The Plurality Of Regions Of The Reorder Queue Stores An Equal Number Of Reorder Queue Entries
402

Allocate A Plurality Of Reorder Queue Entries Into An Instruction Tag Array For Tracking The Reorder Queue Entries Based At Least In Part On An Associated Instruction Tag
404

Load Instruction Tags Into Each Region Of The Plurality Of Regions Beginning With A First Region Of The Plurality Of Regions, Wherein A First Plurality Of Instruction Tags Is Loaded Into The First Region
406

Deallocate All Of The First Plurality Of Instruction Tags Of The First Regionthe Ping Itags Of The First Region
408

Load A Second Plurality Of Instruction Tags To The First Region Of The Plurality Of Regions Subsequent To All Of The Instruction Tags Of The First Region Being Deallocated
410

ALLOCATING AND DEALLOCATING REORDER QUEUE ENTRIES FOR AN OUT-OF-ORDER PROCESSOR

BACKGROUND

Embodiments of the present invention relate in general to instruction sequencing in an out-of-order (OoO) processor, and more specifically to allocating and deallocating reorder queue entries for an OoO processor.

In an out-of-order (OoO) processor, an instruction sequencing unit (ISU) dispatches instructions to various issue queues, renames registers in support of OoO execution, issues instructions from the various issue queues to the execution pipelines, completes execution instructions, and handles exception conditions. Register renaming is typically performed by mapper logic in the ISU before the instructions are placed in their respective issue queues.

SUMMARY

Embodiments of the present invention include methods, systems, and computer program products for allocating and deallocating reorder queue entries for an out-of-order (OoO) processor. A non-limiting example of the computer-implemented method includes dividing, by the OoO processor, the reorder queue into a plurality of regions to store reorder queue entries, wherein each region of the plurality of regions of the reorder queue stores an equal number of reorder queue entries. The method further includes allocating, by an OoO processor, a plurality of reorder queue entries into an instruction tag array for tracking the reorder queue entries based at least in part on an associated instruction tag. The method further includes loading, by the OoO processor, instruction tags into each region of the plurality of regions beginning with a first region of the plurality of regions, wherein a first plurality of instruction tags is loaded into the first region. The method further includes deallocating, by the OoO processor, all of the first plurality of instruction tags of the first region. The method further includes subsequent to all of the instruction tags of the first region being deallocated, loading, by the OoO processor, a second plurality of instruction tags to the first region of the plurality of regions.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Out-of-order (OoO) processors execute instructions in an order based on the availability of input data instead of by the instructions' original order in a program. This enables OoO processors to avoid being idle while waiting for a preceding instruction to complete before retrieving data for a next instruction in a program and to process the next instructions that are able to run immediately and independently. Accordingly, OoO processors reduce wasted cycles because instruction cycles that would otherwise be wasted by delay can be utilized.

Some OoO processors utilize different modes or operating states for processing instructions. For example, an OoO processor can operate in a single thread mode to execute instructions in a single thread (ST) and can operate in a multithread (MT) mode to execute instructions in multiple threads. MT mode can include different types of simultaneous multithreading (SMT) modes (e.g., symmetric multiprocessing 2 (SMP2), symmetric multiprocessing 4 (SMP 4), etc.), which are described in more detail herein.

One or more exemplary embodiments of the present invention provide for allocating and deallocating reorder queue entries for an OoO processor. In previous implementations, allocation and deallocation of load reorder queues (LRQ) and store reorder queue (SRQ) entries was difficult because the queue size was small. For a given thread, the entries were ordered randomly, so a "flash younger" operation was slow (i.e., the younger entries had to be located before they could be flashed). The present techniques improve the efficiency of flash younger operations by providing faster resource release using a load reorder queue (LRQF). In this case, the LRQ and SRQ entries are stored in an in-order queue. For example, a first-in first-out (FIFO) queue may be used.

In ST mode, each of two SRQs (i.e., SRQ0 and SRQ1) have identical contents, so a circular buffer can be used to mark every thread with an ascending store tag to write the SRQ physically. That is, the store tag is marked with a physical tag so that they are in ascending order. An additional bit added to the store tag to mark stores in program order as they enter OoO window (from tag 0 to tag 39). Because a circular buffer is used, the queue wraps after tag 39 back to tag 0 and begins incrementing again. This allows for up to twice as many stores. The same principles apply for the SRQ and the LRQ.

Figure 1:
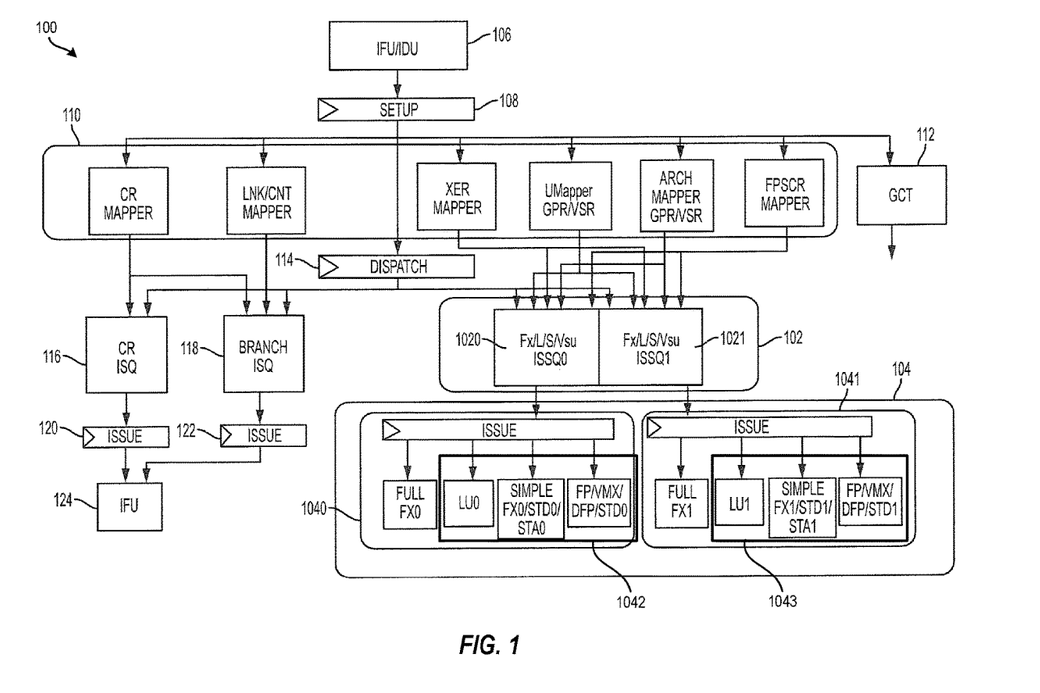
FIG. 1 depicts a block diagram of a processing system that includes an instruction sequencing unit (ISU) of an out-of-order (OoO) processor allocating and deallocating reorder queue entries according to one or more embodiments of the present invention.

Turning now to FIG. 1, a block diagram of a processing system 100 that includes an instruction sequencing unit (ISU) of an out-of-order (OoO) processor wide vector execution in a single thread mode is generally shown according to one or more embodiments of the invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 is shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper GPR/VSR, ARCH Mapper GPR/VSR, and FPSCR mapper are input to issue queue 102. As shown in FIG. 1, issue queue 102 tracks issued floating point instructions (Fx), load instructions (L), store instructions (S), and vector-and-scalar unit (VSU) instructions. As shown in the embodiment of FIG. 1, issue queue 102 is broken up into two parts, ISQ0 1020 and ISQ1 1021, each portion holding forty-eight instructions.

When the processor is executing in ST mode, the issue queue 102 can be used as a single logical issue queue that contains both ISQ0 1020 and ISQ1 1021 to process all of the instructions (in this example all ninety-six instructions) of a single thread. When the processor is executing in MT mode, ISQ0 1020 can be used to process forty-eight instructions from a first thread and ISQ1 1021 is used to process forty-eight instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FPNMX/DFP/STD0 form a load-store unit (LSU) 1042. Similarly, the LU1, the Simple FX1/STD1/STA1, and the FP/VMX/DFP/STD1 form a load-store unit (LSU) 1043.

As shown in FIG. 1, when the processor is executing in ST mode, the first group of execution units 1040 execute instructions issued from ISQ0 1020 and the second group of execution units 1041 execute instructions issued from ISQ1 1021. In alternate embodiments when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
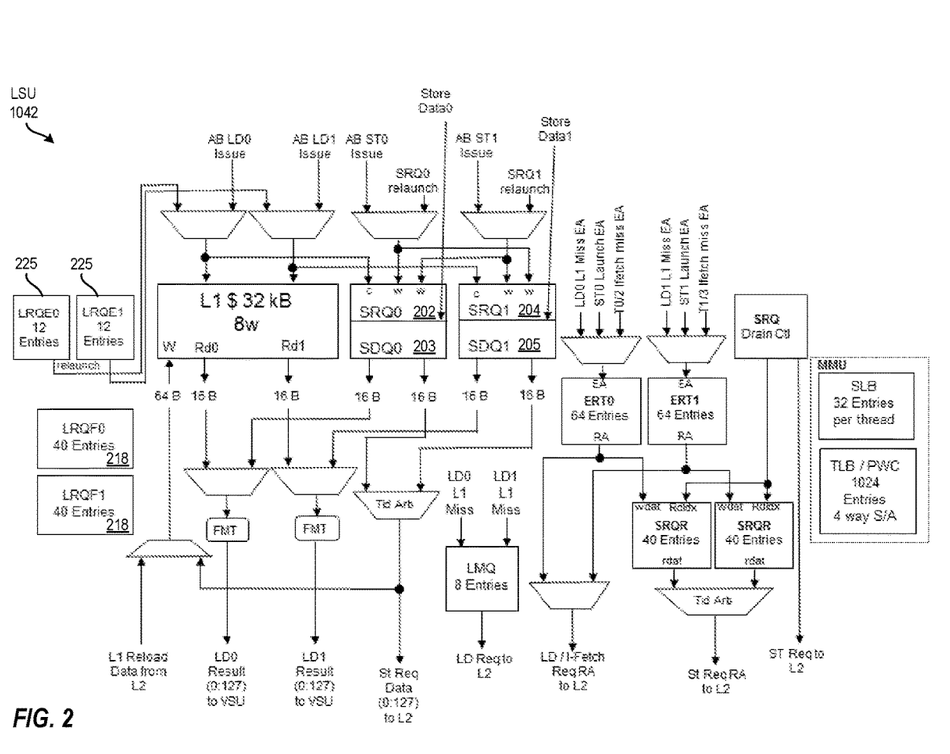
FIG. 2 depicts a block diagram of a load-store unit (LSU) that allocates and deallocates reorder queue entries for an OoO processor according to one or more embodiments of the present invention.

FIG. 2 depicts a block diagram of a load-store unit (LSU) 1042 that allocates and deallocates store reorder queue and store reorder queue entries for an OoO processor according to one or more embodiments of the present invention. The LSU 1042 includes a load-reorder-queue (LRQF) 218, where all load operations are tracked from dispatch to complete. The LSU 1042 further includes a second load-reorder-queue LRQE 225. When a load is rejected (for a cache miss, or translation miss, or previous instruction it depends on getting rejected) the load is taken out of the issue queue and placed in an LRQE entry for it to be re-issued from there. The depicted LRQE 225 is partitioned into 2 instances, LRQE0, and LRQE1 for the two load mode, with 12 entries each (24 entries total). The LRQF 218 facilitates tracking all load operations from issue to completion.

Two store reorder queues (SRQ) 202, 204 are included in the LSU 1042 and have a similar structure as the LRQF 218, with two instances SRQ0 (i.e., SRQ 202) and SRQ1 (i.e., SRQ 204) of 40 entries (each instance), which are circular in order entry allocation, circular in order entry drain, and circular in order entry deallocation. Further, the SRQ 202, 204 are partitioned similar to the LRQ 218, for example, T0, T2 ops launched on pipes LD0, ST0; T1, T3 ops launched on pipes LD1, ST1; and no pipe/thread partition in ST mode. The LSU 1042 depicted in FIG. 2 also includes Store Data Queues (SDQ) 203, 205, which in some embodiments can be integrated as part of the SRQ 202, 204 itself to further save chip area.

In an ST mode, the SRQ0 202 and SRQ1 204 have identical contents, so a circular buffer can be used to mark every thread with an ascending store tag to write the SRQ physically. That is, the store tag is marked with a physical tag so that the queue entries are in ascending order. An additional bit added to the store tag to mark stores in program order as they enter the OoO processor window (from tag 0 to tag 39). Because a circular buffer is used, the queue wraps after tag 39 back to tag 0 and begins incrementing again. This allows for up to twice as many stores. The same principles apply for the SRQ and LRQF.

SRQ entries are allocated at dispatch where the dispatched instruction tags (itags) are filled into the correct row. Further, SRQ entries are deallocated on store drain. Generally, each SRQ 202, 204 has two 40×9 itag arrays partitioned the same as the rest of the respective SRQ. The SRQ entries are allocated at dispatch where the dispatched itags are filled into the correct row of the queue, and the SRQ entries are deallocated on store drain. Dispatch can continue up until two-times the actual SRQ capacity per thread in ST mode and dispatch can continue up to 80 ST stores (80 stores per thread) in SMT2 mode (or 40 stores per thread in SMT4 mode).

Each SRQ 202, 204 has two 40×9 itag arrays to hold "overflow" dispatches. This is written at dispatch if the row in the main SRQ that is desired is still in use. When SRQ entry "x" is deallocated, its corresponding row in the SRQ overflow itag structure is read out and copied into the main SRQ itag array structure (e.g., a read of the overflow itag structure is gated when there are any valid entries in the overflow itag array for a given thread).

The ISU (see FIG. 1) issues stores based on the itag. The main SRQ itag array is cammed (or ½ cammed in SMT4) to determine which physical row to write into upon store issue so that the ISU issues stores based on the itag. "Camming" refers to looking up corresponding addresses, such as a real address corresponding to an effective address (or vice versa) a content addressable memory (CAM). A cam implements lookup table functionality in a single clock cycle using dedicated comparison circuitry. The overall function of a CAM is to take a search word and return the matching memory location. The SRQ 202, 204 send the ISU itag when a store drains and deallocates. The ISU assigns virtual sub-regions to store dispatches to avoid overlapping issues. For example, in ST mode, the ISU cannot issue virtual SRQ entry 40 until real SRQ entry 0 is drained and deallocated. In SMT4 mode, the ISU cannot issue Tx virtual SQR entry 20 until real Tx SRQ entry 0 is drained and deallocated.

Figure 3:
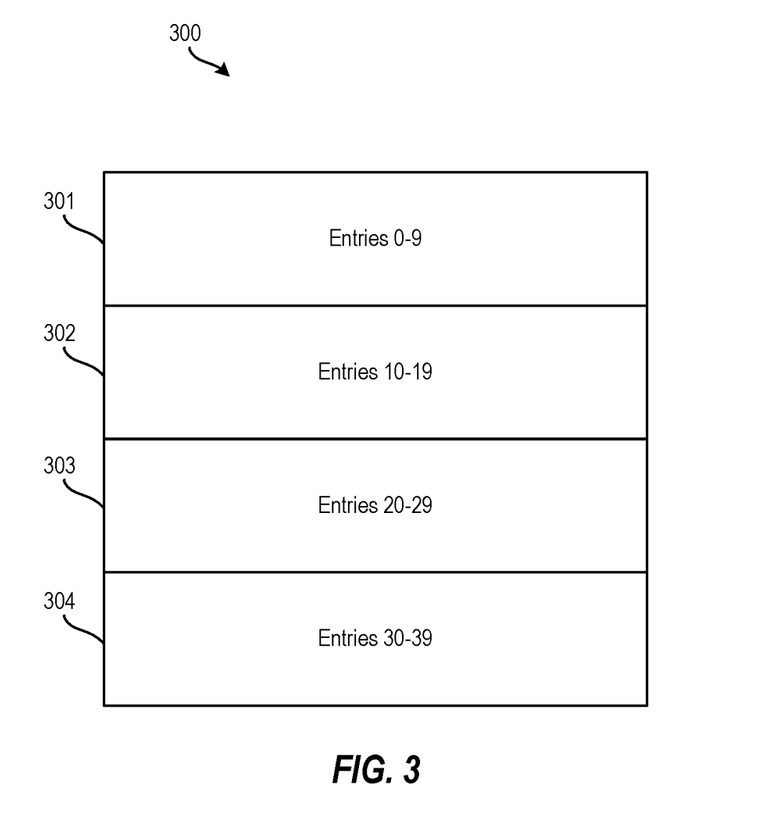
FIG. 3 depicts a block diagram of a reorder queue divided into a plurality of regions to store dispatches for an OoO processor according to one or more embodiments of the present invention.

According to one or more embodiments of the present invention, the ISU can subdivide each thread partition further into multiple regions (i.e., sub regions). For example, FIG. 3 depicts a block diagram of a reorder queue 300 divided into a plurality of regions 301, 302, 303, 304 to store dispatches for an OoO processor according to one or more embodiments of the present invention. The reorder queue 300 can be a store reorder queue (SRQ) or a load reorder queue (LRQ).

As shown in FIG. 3, the reorder queue 300 is divided into four regions (301-304). In the example of FIG. 3, the reorder queue is a 40 entry queue, although other numbers of entries are possible in other embodiments. In the present example, the reorder queue 300 is divided into four regions (301-304) that each store 10 entries. For example, the first region 301 stores entries 0-9, the second region 302 stores entries 10-19, the third region 303 stores entries 20-29, and the fourth region 304 stores entries 30-39.

The four regions 301-304 of the reorder queue 300 can also be referred to as follows: Ping A: SRQ entries 0-9, Ping B: SRQ entries 10-19, Ping C: SRQ entries 20-29, Ping D: SRQ entries 30-39; Pong A: SRQ entries 0-9, Pong B: SRQ entries 10-19, Pong C: SRQ entries 20-29, Pong D: SRQ entries 30-39. Initially, the ISU issues Ping A,B,C,D itags, but the ISU does not issue Pong A itags until Ping A itags have been deallocated. Then, after all Ping A itags are deallocated, ISU will issue Pong A itags but does not issue Pong B itags until Ping B itags have been deallocated, etc. In general, the ISU holds three extra bits in the issue queue entry (1 wrap bit+2 bits to delineate which sub region) to create a pseudo issue dependency based on sub region.

By dividing the SRQ into a plurality of regions, entries can be allocated and deallocated in order in a first-in-first-out structure without the expensive and inefficient overhead of entry-by-entry tracking. This enables fast deallocation by deallocating groups/regions all at once.

In other embodiments, other numbers of regions are also possible. For example, the 40 entry queue could be divided into 5 regions of 8 entries, 10 regions of 4 entries, 20 regions of 2 entries, 2 regions of 20 entries, etc. It should be appreciated that the order queue may be divided to maximize deallocation speed while reducing the processing cost of entry-by-entry tracking.

Figure 4:
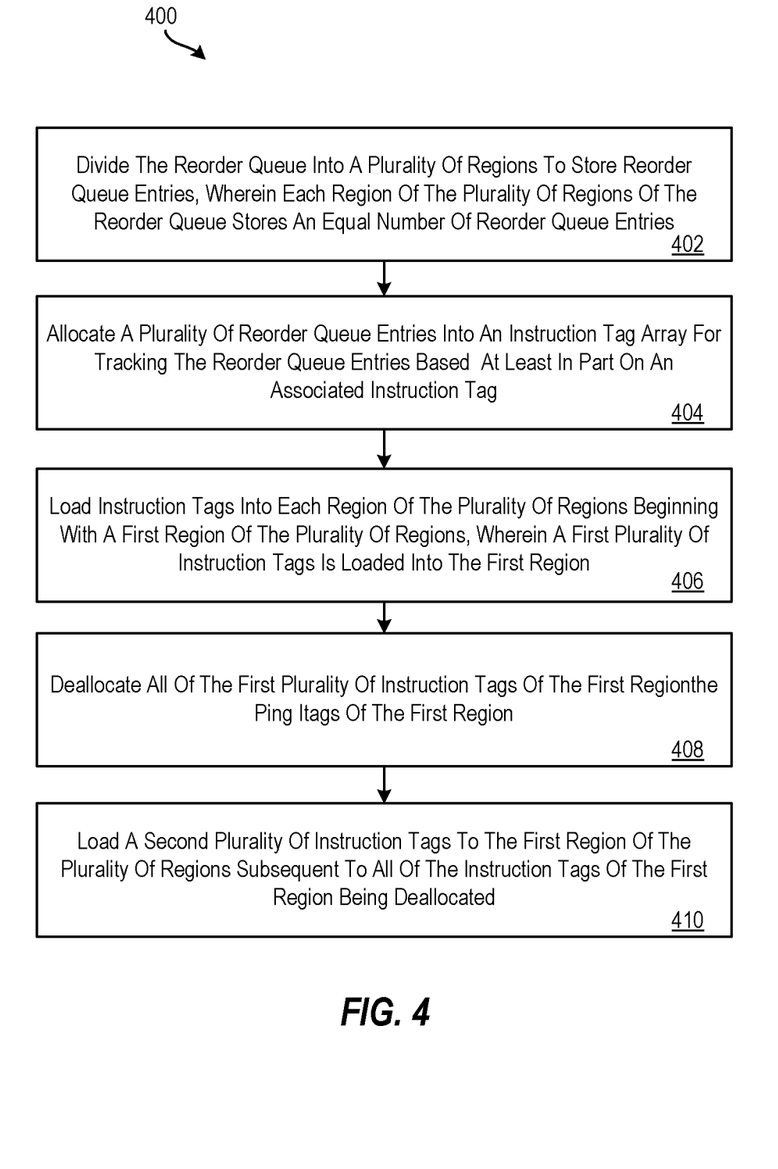
FIG. 4 depicts a flow diagram of a method for allocating and deallocating reorder queue entries for an OoO processor according to one or more embodiments of the present invention.

FIG. 4 depicts a flow diagram of a method 400 for allocating and deallocating reorder queue entries for an OoO processor according to one or more embodiments of the present invention. The method 400 can be implemented by a suitable processing system, such as the processing system 100 of FIG. 1, the processing system 500 of FIG. 5, or another suitable processing system.

At block 402, the OoO processor divides the reorder queue into a plurality of regions to store reorder queue entries. Each region of the plurality of regions of the reorder queue stores an equal number of reorder queue entries. At block 404, the OoO processor allocates a plurality of reorder queue entries into an instruction tag array for tracking the reorder queue entries based at least in part on an associated instruction tag. At block 406, the OoO processor loads instruction tags into each region of the plurality of regions beginning with a first region of the plurality of regions, wherein a first plurality of instruction tags is loaded into the first region. At block 408, the OoO processor all of the first plurality of instruction tags of the first region. At block 410, the OoO processor loads a second plurality of instruction tags to the first region of the plurality of regions subsequent to all of the instruction tags of the first region being deallocated.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
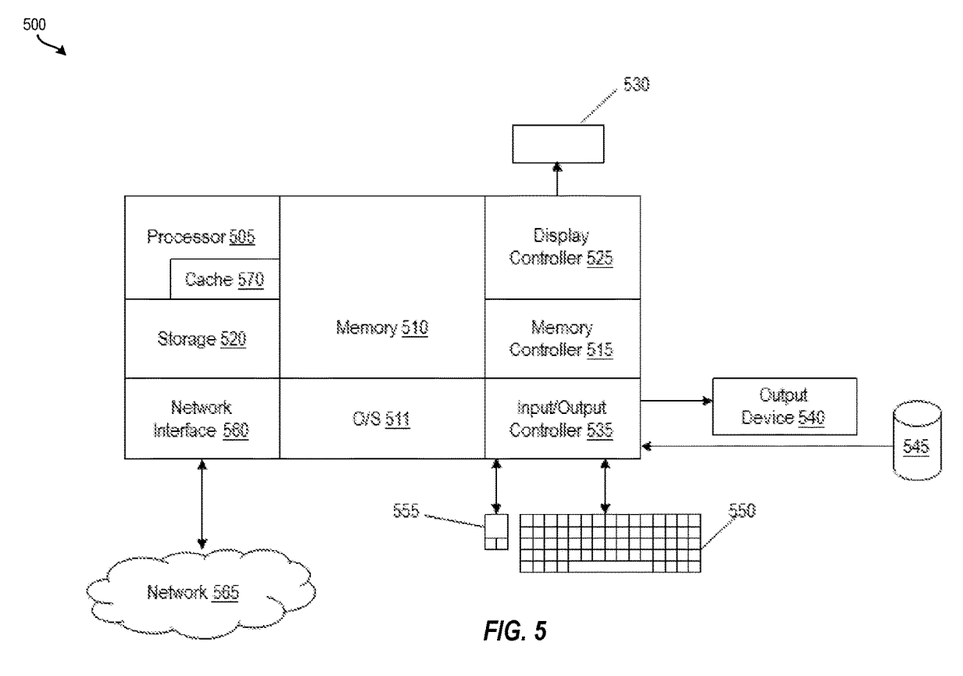
FIG. 5 depicts a processing system for implementing the techniques described herein according to one or more embodiments of the present invention.

Turning now to FIG. 5, a block diagram of a computer system 500 for implementing some or all aspects of one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a mobile device, personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 545 may include, for example, a printer, a scanner, a microphone, and the like. A conventional keyboard 540 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a microprocessor, or other device for executing instructions. The processor 505 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor 505 to execute one or more aspects of the dispatch systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing a partitioned load request queue and store request queue can be embodied, in whole or in part, in computer program products or in computer systems 500, such as that illustrated in FIG. 5.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for allocating and deallocating reorder queue entries for a reorder queue including an overflow array in an out-of-order (OoO) processor, the method comprising:
   dividing, by the OoO processor, the reorder queue into a plurality of regions to store reorder queue entries, wherein each region of the plurality of regions of the reorder queue stores an equal number of reorder queue entries and further wherein the reorder queue comprises an additional instruction tag array to store overflow dispatches;
   allocating, by an OoO processor, a plurality of reorder queue entries into an instruction tag array for tracking the reorder queue entries based at least in part on an associated instruction tag;
   loading, by the OoO processor, instruction tags into each region of the plurality of regions beginning with a first region of the plurality of regions, wherein a first plurality of instruction tags is loaded first into the first region;
   when the first region is in use, loading, by the OoO processor, the first plurality of instruction tags into the overflow array and when the first region is subsequently deallocated loading the first plurality of instruction tags into the first region from the overflow array;
   deallocating, by the OoO processor, all of the first plurality of instruction tags of the first region; and
   subsequent to all of the instruction tags of the first region being deallocated, loading, by the OoO processor, a second plurality of instruction tags to the first region of the plurality of regions.

2. The computer-implemented method of claim 1, wherein the reorder queue is a store reorder queue.

3. The computer-implemented method of claim 1, wherein the reorder queue is a load reorder queue.

4. The computer-implemented method of claim 1, wherein the reorder queue is a circular buffer.

5. The computer-implemented method of claim 1, wherein deallocating all of the instruction tags of the first region is based on a store drain.

6. The computer-implemented method of claim 1, further comprising:
   deallocating, by the OoO processor, all of the instruction tags of a second region of the plurality of regions; and
   subsequent to all of the instruction tags of the second region being deallocated, loading, by the OoO processor, a third plurality of instruction tags to the second region of the plurality of regions.

7. A system for allocating and deallocating reorder queue entries for an out-of-order (OoO) processor, the system comprising:
   a memory having computer readable instructions; and
   the out-of-order processor for executing the computer readable instructions, the computer readable instructions controlling the out-of-order processor to perform operations comprising:
      dividing, by the OoO processor, the reorder queue into a plurality of regions to store reorder queue entries, wherein each region of the plurality of regions of the reorder queue stores an equal number of reorder queue entries and further wherein the reorder queue comprises an additional instruction tag array to store overflow dispatches;
      allocating, by an OoO processor, a plurality of reorder queue entries into an instruction tag array for tracking the reorder queue entries based at least in part on an associated instruction tag;
      loading, by the OoO processor, instruction tags into each region of the plurality of regions beginning with a first region of the plurality of regions, wherein a first plurality of instruction tags is loaded first into the first region;
      when the first region is in use, loading, by the OoO processor, the first plurality of instruction tags into an overflow array and when the first region is subsequently deallocated loading the first plurality of instruction tags into the first region from the overflow array;
      deallocating, by the OoO processor, all of the first plurality of instruction tags of the first region; and
      subsequent to all of the instruction tags of the first region being deallocated, loading, by the OoO processor, a second plurality of instruction tags to the first region of the plurality of regions.

8. The system of claim 7, wherein the reorder queue is a store reorder queue.

9. The system of claim 7, wherein the reorder queue is a load reorder queue.

10. The system of claim 7, wherein the reorder queue is a circular buffer.

11. The system of claim 7, wherein deallocating all of the instruction tags of the first region is based on a store drain.

12. The system of claim 7, the operations further comprising:
   deallocating, by the OoO processor, all of the instruction tags of a second region of the plurality of regions; and
   subsequent to all of the instruction tags of the second region being deallocated, loading, by the OoO processor, a third plurality of instruction tags to the second region of the plurality of regions.

13. A computer program product comprising a computer readable storage medium having program instructions embodied therewith, the program instructions executable by an out-of-order processor to cause the out-of-order processor to perform operations comprising:
   dividing, by the OoO processor, the reorder queue into a plurality of regions to store reorder queue entries, wherein each region of the plurality of regions of the reorder queue stores an equal number of reorder queue entries and further wherein the reorder queue comprises an additional instruction tag array to store overflow dispatches;

allocating, by an OoO processor, a plurality of reorder queue entries into an instruction tag array for tracking the reorder queue entries based at least in part on an associated instruction tag;

loading, by the OoO processor, instruction tags into each region of the plurality of regions beginning with a first region of the plurality of regions, wherein a first plurality of instruction tags is loaded first into the first region;

when the first region is in use, loading, by the OoO processor, the first plurality of instruction tags into the overflow array and when the first region is subsequently deallocated loading the first plurality of instruction tags into the first region from the overflow array;

deallocating, by the OoO processor, all of the first plurality of instruction tags of the first region; and subsequent to all of the instruction tags of the first region being deallocated, loading, by the OoO processor, a second plurality of instruction tags to the first region of the plurality of regions.

14. The computer program product of claim 13, wherein the reorder queue is a store reorder queue.

15. The computer program product of claim 13, wherein the reorder queue is a load reorder queue.

16. The computer program product of claim 13, wherein the reorder queue is a circular buffer.

17. The computer program product of claim 13, wherein deallocating all of the instruction tags of the first region is based on a store drain.

18. The computer program product of claim 13, the operations further comprising:

deallocating, by the OoO processor, all of the instruction tags of a second region of the plurality of regions; and subsequent to all of the instruction tags of the second region being deallocated, loading, by the OoO processor, a third plurality of instruction tags to the second region of the plurality of regions.

* * * * *